Dec. 7, 1954        C. W. ATTWOOD        2,696,139

NUT FOR LOCKING ENGAGEMENT WITH UNISTRUT

Filed May 28, 1952

*INVENTOR.*
CHARLES W. ATTWOOD

*Hauke & Hardesty*

ATTORNEYS

United States Patent Office 2,696,139
Patented Dec. 7, 1954

2,696,139

NUT FOR LOCKING ENGAGEMENT WITH UNISTRUT

Charles W. Attwood, Wayne, Mich.

Application May 28, 1952, Serial No. 290,534

2 Claims. (Cl. 85—32)

The present invention relates to a special nut for use in erecting structures of channeled metal marketed under the trade name of "Unistrut."

This material consists of a fairly heavy gauge steel or other metal rolled to provide a channel of rectangular cross section showing the edge portions of the metal strip to be turned in at right angles to the side walls of the channel and there again inwardly at right angles so that there is produced a rectangular member having a longitudinal slot along the edge of which are short inturned flanges. These flanges are preferably sharpened.

Among the objects of the invention is to produce a metal nut provided with grooves adapted to cooperate with edges of the above mentioned flanges so as to enable the secure anchorage of other parts to the channeled material by means of bolts or screws.

Other objects and advantages will readily occur to those skilled in the art upon reference to the following description in which Fig. 1 is a perspective view showing a typical construction detail using the nut of the present invention.

Figure 1:
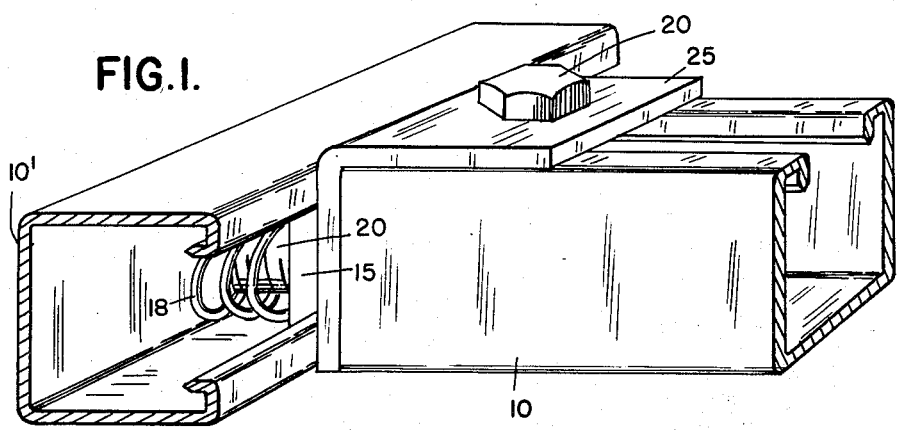
Figure 2:
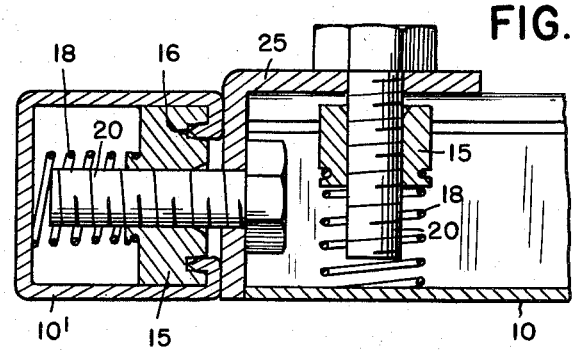
Fig. 2 is a central sectional view of the detail shown in Fig. 1.

As indicated in the drawing, structures in which the present nut is used may be produced by securing the channeled members 10 and 10' together by the use of a fitting or bracket 25, the bracket being first fixed to member 10' by the use of screw 20 and nut 15 and then fixed to member 10 with a similar screw and nut.

The nut used and embodying the present invention is shown in detail in Figs. 3, 4, 5, and 6. It consists of an approximately rectangular piece somewhat longer than wide and having diagonally opposite corners removed so that the nut can be partially rotated within the channel. Adjacent the curved ends 30 are a pair of grooves 16 spaced equally from the tapped opening 32 and from each other a distance equal to the distance between the inturned flanges of the channeled material 10 or 10'. The long dimension of the nut at right angles to grooves 16 is substantially the same as the inside width of the channeled material 10 or 10'. The width of the nut is slightly less than the width of the slot in the channeled material.

Figure 4:
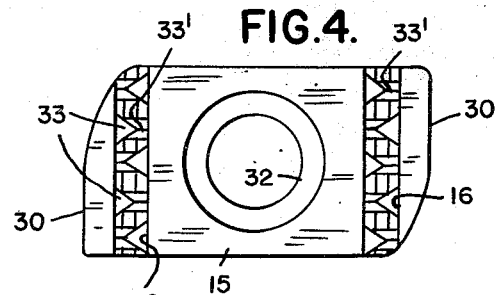
Fig. 4 is a plan view of the grooved face of the nut.
Figure 5:
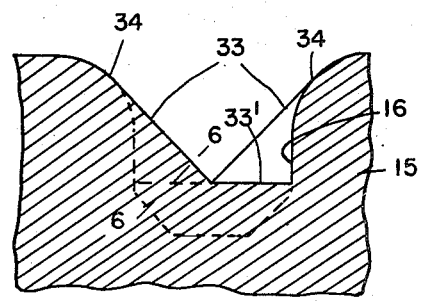
Fig. 5 is a part section through one of the grooves on an enlarged scale.
Figure 6:
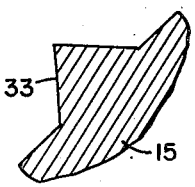
Fig. 6 is a section on line 6—6 of Fig. 5.

As shown in Figs. 4 to 6, the grooves 16 are provided with sharpened inwardly projecting teeth 33, arranged on both walls of a groove and alternating from one side to the other.

In Fig. 5 is shown the preferred form of groove and teeth. In this figure the edges 34 of the groove are shown as rounded and the edges of the sharpened teeth 33 shown as inclined downwardly from a rounded edge to the center of the groove and then horizontally as at 33' to the opposite groove wall.

Figure 3:
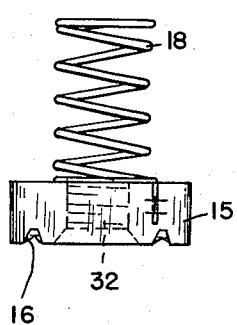
Fig. 3 is a side elevation of one of the new nuts.

As shown in Fig. 3, each of the nuts has fixed thereto a helical spring 18.

In the use of the nut, it is first inserted through the slot of the channel material, then partially rotated to bring the grooves 16 into registry with the inturned flanges, then placed in the desired location along the channel.

Upon application of the part to be fixed to the channeled material and passage therethrough of a suitable bolt or screw, the latter will enter the nut and may be tightened securely.

Upon tightening of the bolt or screw sufficiently, the teeth 33 bite into the inturned flanges from both sides and the bottom of the grooves, and effectively prevent relative movement of the parts.

I claim:

1. A nut for use in fixing parts to "Unistrut," said nut consisting of a relatively narrow rectangular metal piece having a centrally located tapped opening and having two diagonally opposite corners removed, said nut being provided on one face with a spring arranged normal to the nut face and having in its opposite face parallel cross grooves, said grooves having teeth projecting into the grooves from the side walls thereof, the teeth on one side being interspaced with those on the opposite side, the edges of said teeth converging downwardly from the respective upper margins of said grooves to cross at and extend beyond the center line of the latter, whereby the teeth overlap one another in the bottom portions of the grooves.

2. A nut for use in fixing parts to "Unistrut," said nut consisting of a relatively narrow rectangular metal piece having a centrally located tapped opening and having two diagonally opposite corners removed, said nut being provided on one face with a spring arranged normal to the nut face and having in its opposite face parallel cross grooves, said grooves having teeth projecting into the grooves from the side walls thereof, the teeth on one side being interspaced with those on the opposite side, said teeth being inclined from the upper margin of said grooves toward the centerline thereof and then horizontally to the opposite wall of the groove.

References Cited in the file of this patent

UNITED STATES PATENTS

| Number | Name | Date |
|---|---|---|
| 2,345,650 | Attwood | Apr. 4, 1944 |
| 2,380,379 | Attwood | July 31, 1945 |